July 17, 1962

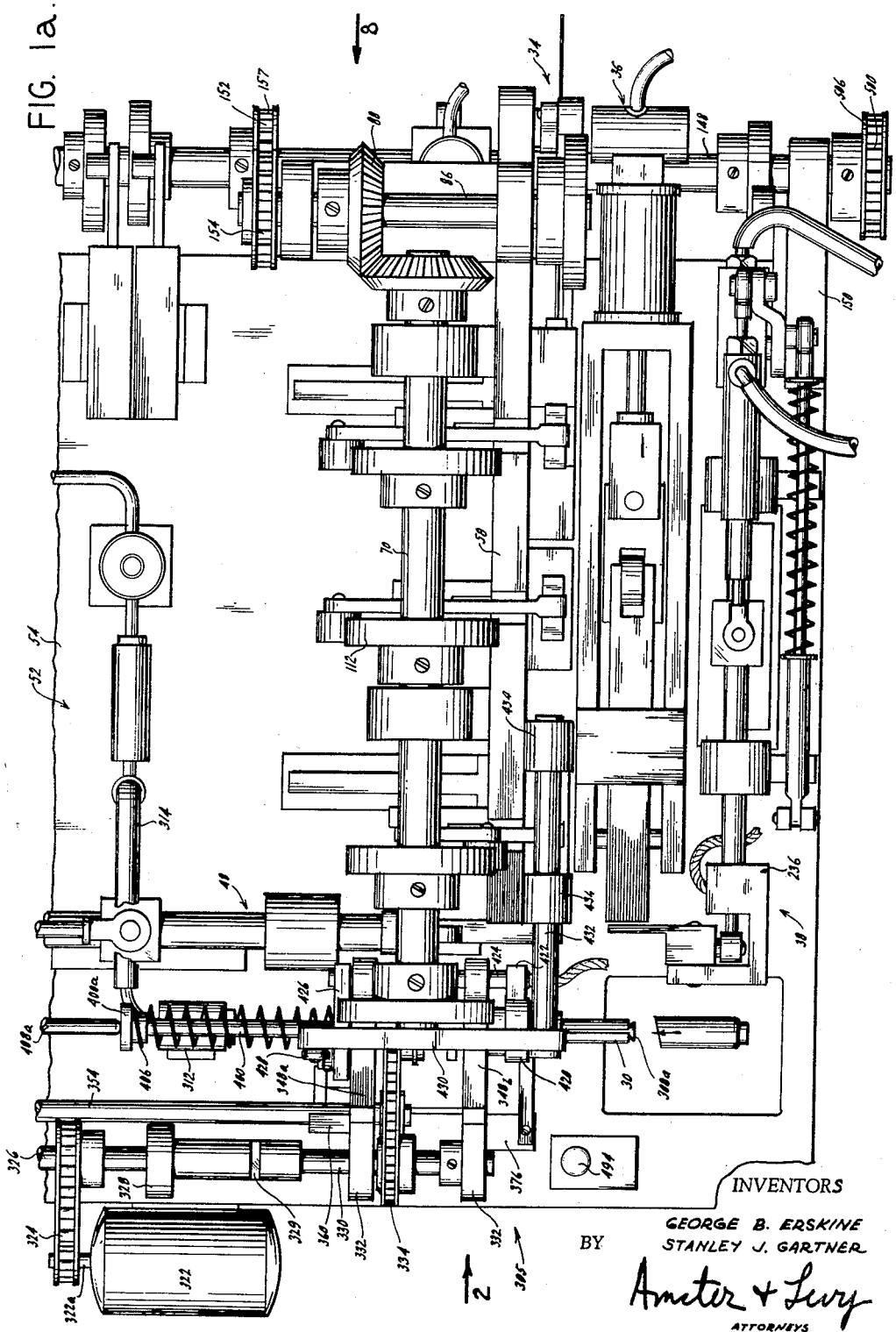

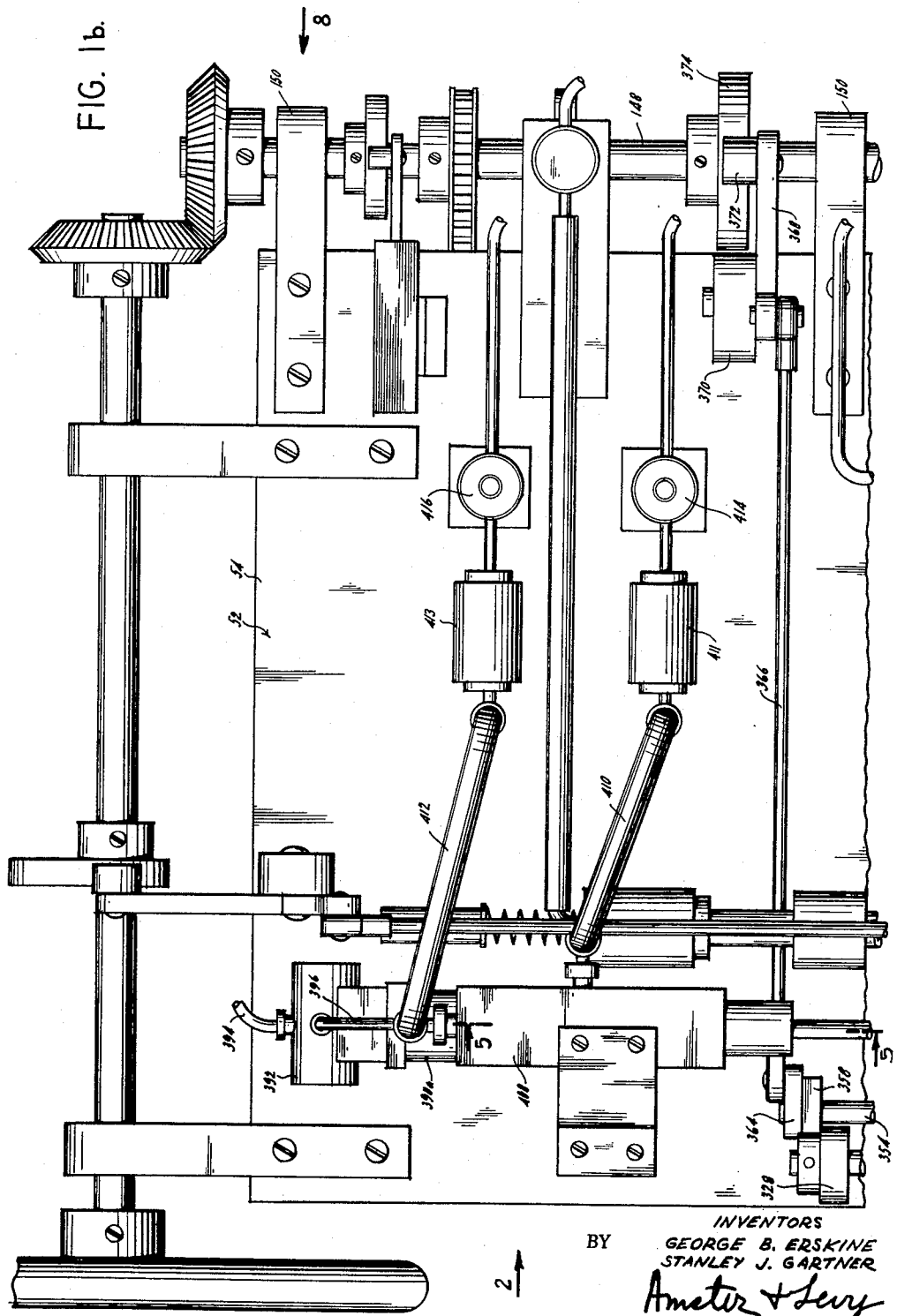

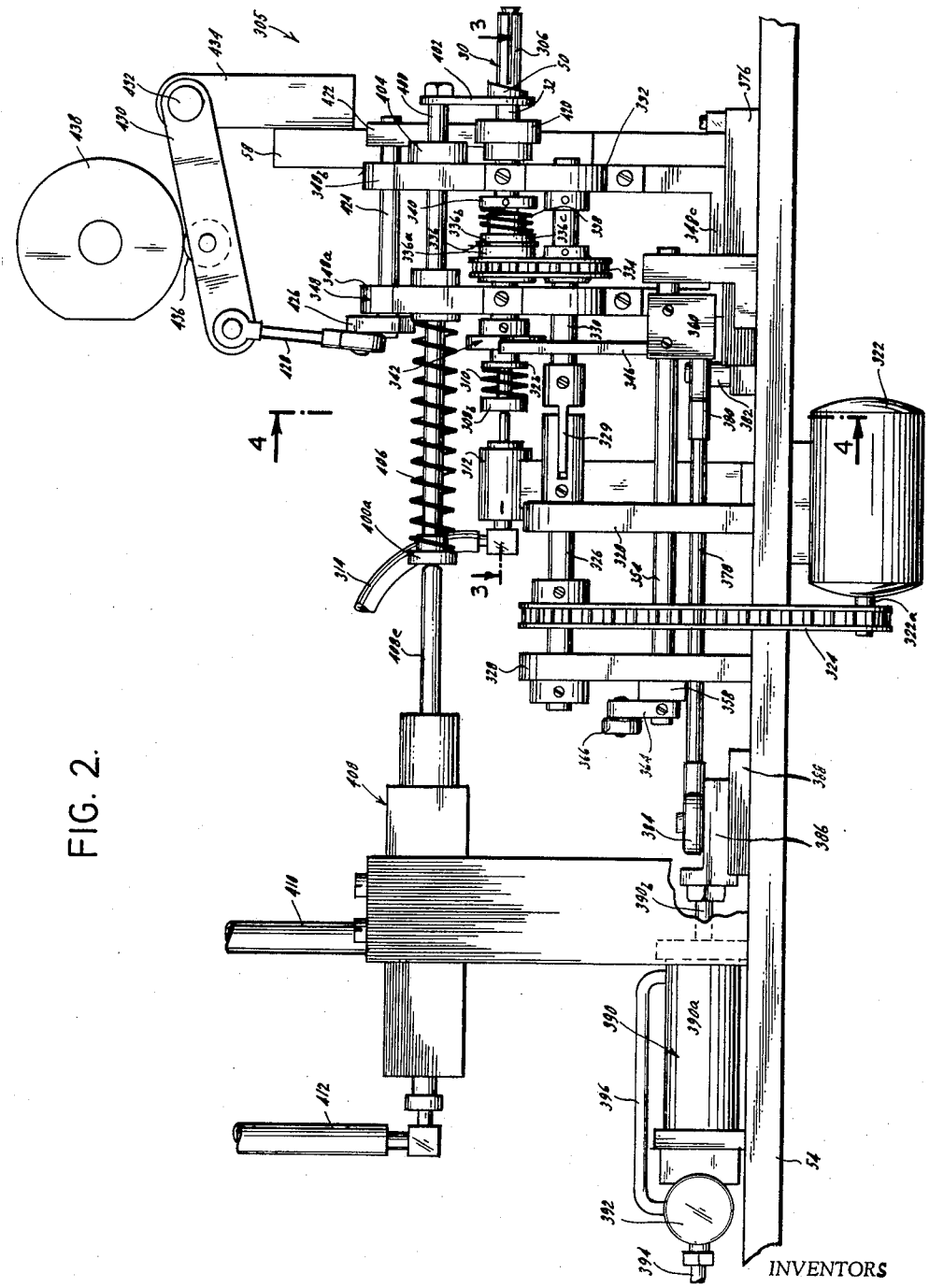

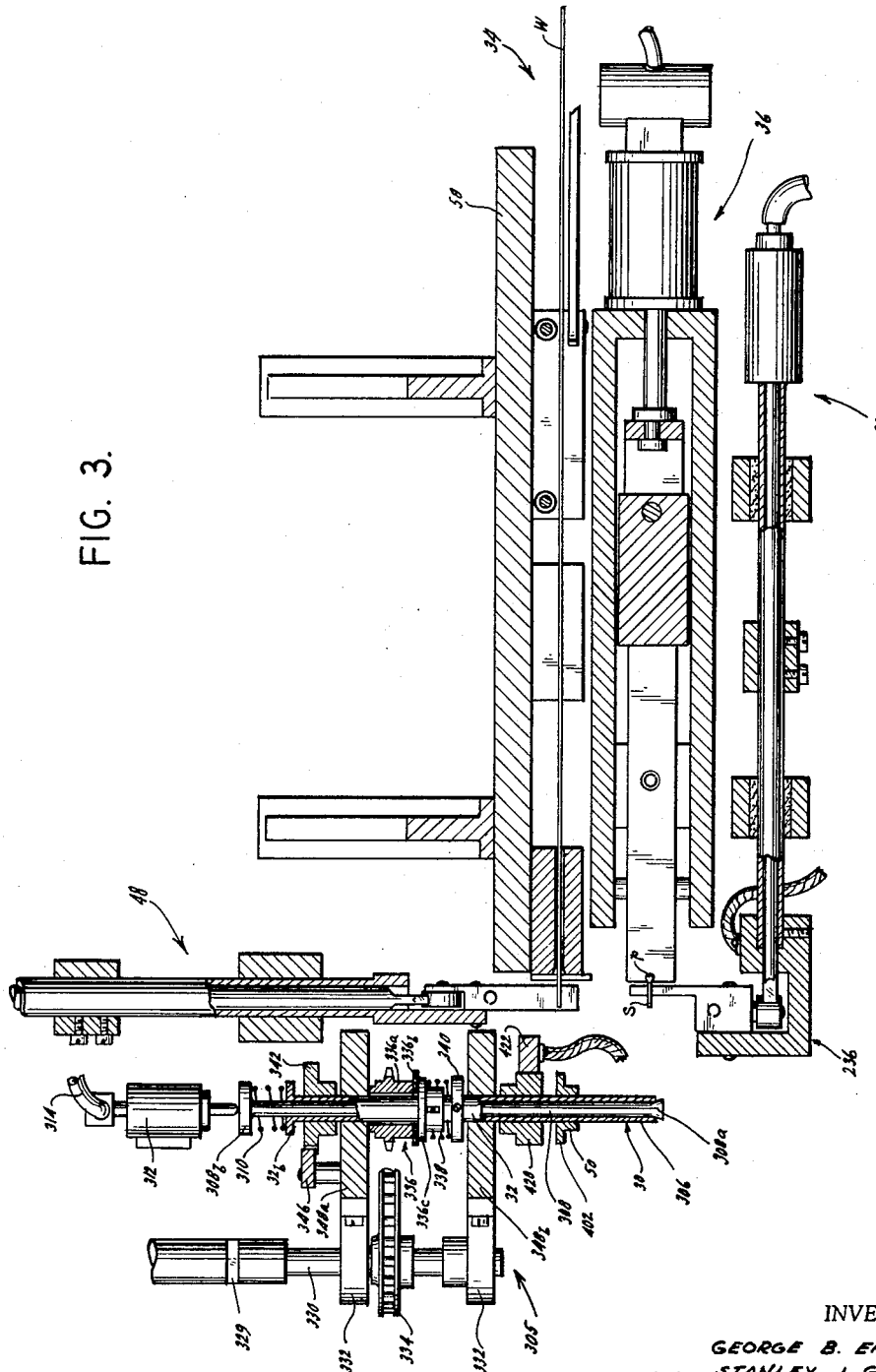

G. B. ERSKINE ET AL
WORK SUPPORT HEAD AND MANDREL FOR THE
MANUFACTURE OF STUDDED ELECTRODES 3,044,789

Original Filed Oct. 3, 1957

INVENTORS
GEORGE B. ERSKINE
BY STANLEY J. GARTNER

Ameter + Levy
ATTORNEYS

INVENTORS
GEORGE B. ERSKINE
STANLEY J. GARTNER
BY Amster + Levy
ATTORNEYS

United States Patent Office 3,044,789
Patented July 17, 1962

3,044,789
WORK SUPPORT HEAD AND MANDREL FOR THE MANUFACTURE OF STUDDED ELECTRODES
George B. Erskine and Stanley J. Gartner, Emporium, Pa., assignors to Emporium Specialties Co., Inc., Emporium, Pa., a corporation of Pennsylvania
Original application Oct. 3, 1957, Ser. No. 687,913, now Patent No. 2,951,933, dated Sept. 6, 1960. Divided and this application Jan. 22, 1960, Ser. No. 4,120
9 Claims. (Cl. 279—2)

The present invention relates generally to an improved machine and method for the manufacture of studded electrodes, and in particular to an improved mandrel incorporated in an automatic studding machine to receive electrode bodies and to hold same in proper orientation to have studs welded thereupon. This is a division of our co-pending application Serial No. 687,913, filed on October 3, 1957, now Patent No. 2,951,933.

In the electron gun assembly of a wide variety of cathode ray tube devices, such as television picture tubes, it is necessary to employ a series of electrodes maintained at prescribed operating potentials to form, focus and direct the electron beam. Such electrodes usually take the form of cup-like or sleeve-like electrode bodies each having a number of radially-extending mounting studs or pins welded to their outer peripheries at circumferentially-spaced locations. The studs or pins are usually disposed in groups spaced axially of the electrode body and provide a means by which the electrodes can be mounted in the neck section of the tube envelope. The mounting of the electrodes in the tube envelope is usually achieved by embedding flattened or swaged terminal portions of the studs in supporting rods of glass or similar thermoplastic material which serve to mount the several electrodes in the required orientation relative to each other and to the remaining components of the electron gun assembly.

It has been the general practice in the industry to construct these and other similar types of electrodes by a series of manual operations involving the use of assembly jigs and fixtures. To illustrate a typical hand assembly operation, the electrode body is supported on a jig and successive studs or pins are manually assembled with the electrode body, frequently by the use of an appropriate jig or fixture, and thereafter welded to the surface of the electrode body with the aid of a conventional bench welder. This hand method, by its very nature, is time consuming, tedious, painstaking, and necessitates multiple handlings of the studs and electrode bodies incident to achieving the final assembly. Usually, the studs are made in a first and separate operation, brought to the bench welder, and thereafter assembled as previously described. Apart from the problems attendant to the hand method of manufacture, the final electrode is frequently unsatisfactory in quality and often does not come up to accepted commercial standard. For most applications, it is essential that the mounting studs be precisely located both circumferentially and axially of the electrode body. The difficulty in obtaining a precision assembly within the prescribed tolerances established by the industry may be appreciated by considering a typical electrode which incorporates two groups of spaced studs each consisting of three studs spaced circumferentially at 120° intervals. Not only is it necessary to maintain close tolerance in the spacing of the studs in the respective groups, but it is also necessary to maintain accurate spacing and alignment between the groups. The overall problem is further complicated by the necessity of having very strong joints between the respective studs and the electrode body and by the inherent problems attendant to handling parts which are comparatively small in size, the mounting studs often being as small as one quarter of an inch in overall height.

It is broadly an object of the present invention to provide an improved method and machine for the manufacture of studded electrodes of the aforesaid type. Specifically, it is within the contemplation of the present invention to provide a highly versatile bench-type of automatic machine for forming studs and welding successive formed studs to a sleeve-like electrode body in a prescribed pattern.

From time to time, as the design of gun assemblies change and as new components are developed incorporating such electron gun assemblies, it is necessary to handle different size electrode bodies and to weld one or more groups of radially-extending, circumferentially-spaced studs to the electrode bodies with different circumferential spacing between the studs of each group and different axial spacing between the groups. For example, some assemblies may require an electrode body having two, three or four studs about a circumferential path, with one, two or three such groups at varying spacings along the length of the electrode body. To meet such situations as they are encountered, without the necessity of completely reconstructing and redesigning the machine, it is quite important that the machine be readily convertible from one type of operation to another in a comparatively short change-over time, with the replacement of relatively few parts in the machine.

It is a further object of the present invention to provide an improved method and machine for the manufacture of studded electrodes which is exceptionally versatile and readily adapted to weld studs to electrode bodies of different sizes in many different arrays.

Advantageously, our improved machine may be attended by a single operator who merely places successive electrode bodies on a work-supporting mandrel. The very nature of our mechanisms establishes a high order of accuracy in the forming and welding of successive studs and enables the mass production of studded electrodes of high quality and at comparatively low unit cost.

In accordance with the present invention, electrodes of the type including one or more radially-extending studs welded to an electrode body are manufactured by cutting off a length of wire to form a stud, swaging the rearward end of the stud to form a flattened ear or terminal, bringing the forward end of the stud into contact with the electrode body with the stud extending radially of the body, and welding the stud to the body. Thereupon, the electrode body is axially rotated through a prescribed angular traverse corresponding to the desired circumferential spacing between the successive studs and the enumerated steps are repeated to form and weld a further stud to the body at a location circumferentially spaced from the first stud. The operation is repeated, if needed, to join one or more further studs to the electrode body. If the particular studded electrode is to embody a further row or group of radially-extending studs, the body is displaced axially through a distance corresponding to the desired spacing between the groups and the assembly steps are repeated to weld one or more further studs to the body at circumferentially spaced locations displaced axially from the first group of studs.

An illustrative machine embodying features of the present invention for the manufacture of studded electrodes of the type including a cylindrical electrode body having a group of circumferentially-spaced, radially-extending studs welded thereto comprises a mandrel mounted for axial rotation and adapted to receive the electrode body to rotate the same whereby successive spaced locations about a circumferential path are brought into a welding position. Stud forming and transfer mechanisms are arranged to form and transfer successive studs into contact with the body as the spaced locations about the circumferential path are brought into the welding position. An indexing drive is operatively connected to the mandrel for indexing the same through a prescribed angular traverse in timed relation to operation of the stud forming and transfer mechanisms. Finally, appropriate means are provided for applying welding current to successive studs brought into the welding position. In the event that the cylindrical body is to include a further group of circumferentially-spaced, radially-extending studs welded thereto, the mandrel is mounted so that it may be displaced from its first position axially through a prescribed stroke to a second position wherein the mandrel can be indexed, as in the first instance, to bring spaced locations about the second circumferential path into a welding position to receive successive studs.

The above brief description, as well as further objects, features, advantages and applications of the present invention will best be appreciated by reference to the following detailed description of a presently preferred method and machine, when taken in conjunction with the accompanying drawings wherein:

FIGS. 1a and 1b, which are to be placed side by side on the broken lines indicated at the respective margins to make up FIG. 1 is a plan view of a machine for the manufacture of studded electrodes embodying features of the present invention;

FIG. 2 is a front elevational view, taken from the left of FIG. 1 and in the direction of the arrow 2, showing the details of the work-supporting mandrel, its supporting carriage and the associated actuating and operating mechanisms;

FIG. 3 is a horizontal section, taken substantially along the lines 3—3 of FIG. 2 with certain parts omitted, showing the relationship between the wire feeding, stud transfer, stud swaging, and weld transfer mechanisms, as well as details of the mandrel and its associated actuating and operating mechanisms;

Figure 10:
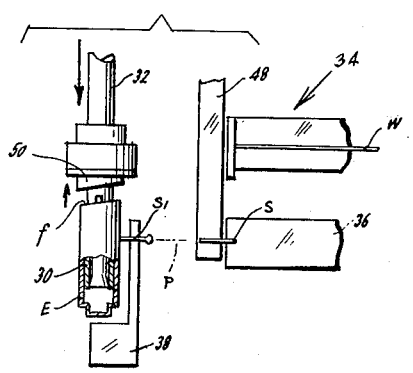
Figure 11:
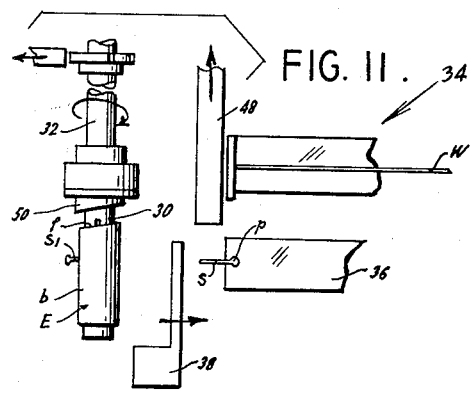
Figure 12:
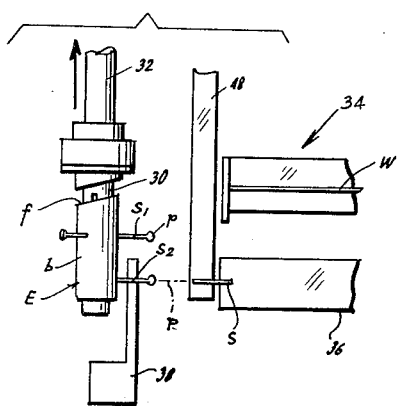
Figure 13:
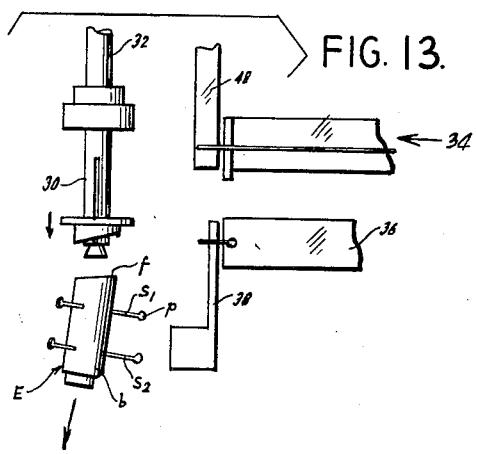

FIGS. 10 to 13, inclusive, are diagrammatic showings of some of the essential operating mechanisms of the machine in their related positions of movement during a typical sequence of operation for the formation of a studded electrode, to wit:

FIG. 10 shows the relationship of the stud forming transfer swaging weld transfer and mandrel mechanisms to each other showing the weld transfer mechanism in welding position, the next stud having been transferred to the swaging device;

FIG. 11 is a view at a time later in the cycle illustrating the indexing of the mandrel, the return of the weld transfer mechanism to pick up a further stud at the swaging station, and the return of the stud transfer mechanism to permit the formation and pickup of the next stud;

FIG. 12 is a view similar to FIGS. 10 and 11, but at a time later in the cycle and after the mandrel has been axially displaced to bring a further circumferential path of the electrode body into position to receive a group of radially-extending, circumferentially-spaced studs; and FIG. 13 is a view similar to FIG. 12, but showing a completed studded electrode being ejected with the stud and weld transfer mechanisms in position for the next sequence of operations on an electrode body to be placed upon the mandrel.

Preliminary to a detailed consideration of the present machine for the manufacture of studded electrodes, as shown specifically in FIGS. 1 to 9, inclusive, brief reference will be made to FIGS. 10 to 13, inclusive, for a general description of the function and operation of the several mechanisms incorporated into the present machine and their relationship to facilitate a more thorough understanding of the detailed description as the same proceeds.

A typical studded electrode which may be manufactured in the present machine is shown in FIG. 13 and is generally designated by the letter E. Such studded electrode E includes a generally cylindrical electrode $b$ which terminates in a rear face $f$ which is cut at a slant angle to occupy a plane which is skewed relative to a transverse section through the electrode body. In this illustrative studded electrode E, first and second groups of studs $s_1$, $s_2$ are welded to the electrode body $b$. The three studs of the group $s_1$ each extend radially and are circumferentially spaced relative to each other by 120°; while the three studs of the second group $s_2$ are similarly spaced at 120° intervals, with respective pairs of studs of the first and second groups aligned with each other. This type of studded electrode is typical, but illustrative, of the many and varied types which may be manufactured by the present machine.

The illustrative machine incorporates a mandrel 30 which is adapted to receive the electrode body $b$ and means including a supporting shaft 32 mounting the mandrel 30 for axial rotation to bring prescribed space locations about the circumference of the electrode body into a welding position. Specifically, the assembly of the mandrel 30 and its supporting shaft 32, as well as further components hereinafter described, are mounted for axial rotation in a first position (see FIGS. 10 and 11) whereby successive locations along a first circumferential path about the electrode body may be brought into a welding position, generally designated by the letter P. Further, the mandrel 30 and the shaft 32 may be retracted, as indicated by the directional arrow in FIG. 12, whereby successive locations along a further circumferential path about the electrode body $b$ may be brought into the welding position P (see FIGS. 12 and 13).

Stud forming and transfer mechanisms, generally designated by the reference numerals 34, 48 are provided at a location laterally offset from the welding position P for cutting successive studs $s$ from a continuous length of wire W and for thereafter transferring the successive lengths of wire laterally to swaging mechanisms, generally designated by the reference numeral 36. The swaging mechanisms 36 are arranged to flatten the rearward ends of successive studs to provide ear-like projections or terminal portions $p$. Weld transfer mechanisms, generally designated by the reference numeral 38, are arranged to pick up successive swaged studs at the swaging mechanisms or station 36 and to transfer the same through an axial thrust at the weld position P toward and into contact with the electrode body $b$ supported on the mandrel 30.

Mounted on the mandrel 30 is a combined reference and stripping flange or shoulder 50. The flange 50 provides a stop against which the electrode body $b$ with the slant rear face $f$ can be oriented by the operator when placing electrode body b on to the mandrel 30. After locking of the part on the mandrel, by mechanisms to be subsequently described, the combined reference and stripping flange 50 moves to the retracted position illustrated in FIGS. 10, 11 and 12, in which position the flange 50 does not interfere with the indexing of the mandrel to bring the prescribed locations about the first and second circumferential paths into position to receive the studs. Finally, the combined reference in stripping flange 50 is adapted to move through a forward stroke, as may be seen in FIG. 13, whereby the studded electrode is stripped from the mandrel.

Brief reference will now be made to this group of figures to describe successive operations in the studding of an electrode body. A stud S is formed in the stud forming mechanism 34 from a length of wire W. After the length of wire S is cut off, the closed stud transfer jaws 48 advance laterally through a prescribed stroke from the retracted position illustrated in FIG. 13, to the advanced position illustrated in FIG. 10, in which the rearward end of the stud S is engaged by the swaging mechanisms to form the flattened ear or projection p. When the stud transfer jaws 48 are in the advanced position of FIG. 10, the weld transfer jaws 38 are in position to hold the previously formed stud against the electrode body b for the welding operation. The swaging mechanisms 36 include swaging jaws which close on the rear end of the stud while held by the stud transfer jaws 48. After the swaging operation is completed, the swaging jaws support the stud by its swaged end whereby the stud transfer jaws are able to retract, as indicated by the directional arrows in FIG. 11, and the weld transfer jaws 38 are able to move into the pickup position of FIG. 13, as indicated by the directional arrow in FIG. 11.

Referring now to FIGS. 10 and 11, after the first stud is welded to the electrode body b and the weld transfer jaws 38 begin to return to the pickup position in relation to the swaging mechanisms 36, the mandrel 30 indexes through a prescribed angular traverse to bring a further location along the first circumferential path into alignment with the weld line or path P to receive the next stud formed within the machine. In the illustrative construction, a group of three studs $s_1$ are welded along the first circumferential path at intervals of 120°.

After the first group of studs are welded to the electrode body, appropriate mechanisms connected to the mandrel supporting shaft 32 retract the mandrel through a prescribed rearward stroke, as may be seen by progressively inspecting FIGS. 11 and 12. This brings a second circumferential path axially spaced from the first circumferential path into position to have successive spaced locations about the second circumferential path brought into the welding position P. With the mandrel 30 in the retracted position of FIG. 12, the stud forming and welding operations are repeated to weld the desired number of studs about the periphery of the electrode body along the second circumferential path. In this illustrative embodiment, a group of three studs $s_2$ are welded to the electrode body b at 120° intervals, with the respective studs of the second group $s_2$ in alignment with the respective studs of the first group $s_1$.

Upon completion of the second group of studs, the combined reference and stripping flange 50 moves through a forward stroke, after unlocking of the mandrel, to strip the studded electrode E from the mandrel, as seen in FIG. 13. Upon completion of the stripping action, the flange 50 returns to the reference position. Thereupon, the operator places the next electrode body b on to the mandrel and again initiates the operation of the machine.

Referring now to FIGS. 1 to 9 of the drawings, detailed reference will be made to the mechanism of the work supporting mandrel and its relation to other portions of the machine for studding electrodes in accordance with the present invention. Preliminary to a detailed description of the work support head a brief description of the overall machine will be given.

Figure 8:
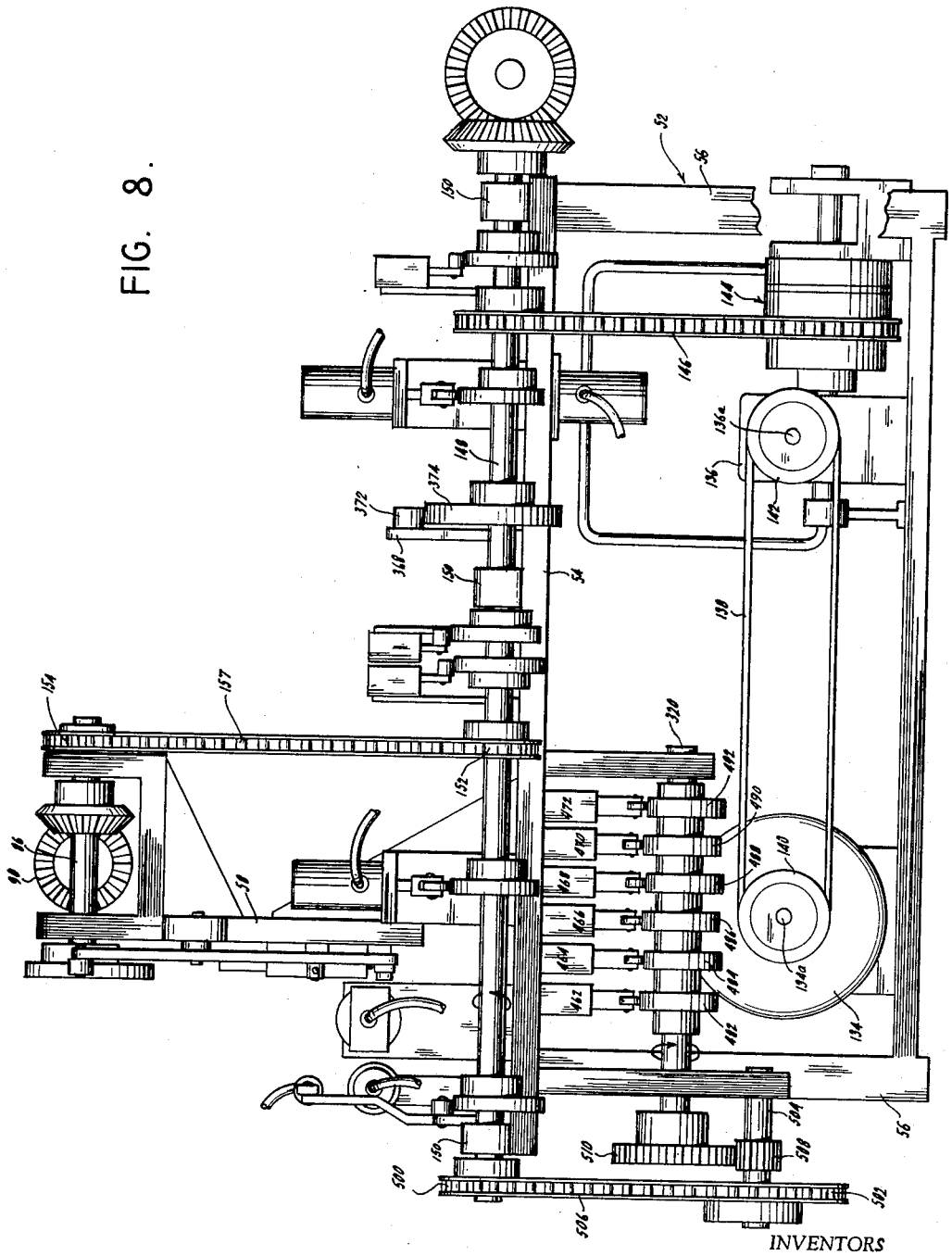
FIG. 8 is a rear elevational view of the machine, taken from the right of FIG. 1 and in the direction of the arrow 8.

As seen in FIG. 1 the stud forming mechanisms 34 are located along the upstanding wall 58 which rise from the bed plate 54 of the bench-like support 52 which has leg supports 56 (see FIG. 8). A wire W enters the machine and travels, to the left in FIG. 1 through the forming mechanism which is described in greater detail in our co-pending application, Serial No. 687,913, filed on October 3, 1957, now Patent No. 2,951,933. After a stud S has been formed by the forming mechanisms 34 it is transported by the transfer mechanisms 48, in a direction perpendicular to the length of the forming mechanisms 48, to the swaging mechanisms 36. The swaging mechanisms are parallel to and immediately beside the forming mechanisms 34 on the bed plate 57 such that the wall 58 and the swaging mechanisms 36 are on either side of the forming mechanisms 34. The swaging mechanisms are effective to group the stud S at one end and to form a flattened ear p thereupon. After this operation has been accomplished the weld transfer mechanisms 33, which are parallel to the swaging mechanisms 36 on the bed plate 54 transfer the swaged studs to the left, in FIG. 1, and into contact with an electrode E on the mandrel 30. The weld transfer mechanisms 38 are effective to bring the studs into contact with the electrode E under proper welding pressure at which time a welding current is introduced, through the weld transfer mechanisms 38 and the mandrel 30, to weld the stud S to the electrode E.

The operations of these various mechanisms are controlled in a coordinated fashion by a series of cam shafts which are interconnected by appropriate gearing. As seen in FIG. 8, a main motor 134 is mounted beneath the bed-plate 54 on the supporting frame 52 and has its output shaft 134a coupled to the input shaft 136a of a reduction gearing unit 136 via a belt 138 trained over the pulleys 140, 142, connected to the respective shafts 134a, 136a. The output shaft of the reduction gearing unit 136 is connected to a pneumatic brake and clutch, generally designated by the numeral 144, which has an output driving sprocket coupled to a chain 146 which is also trained about a driven sprocket carried on the main cam shaft 148. The main cam shaft 148 is journaled on the bed-plate 54 by appropriate bearings 150 and is rotated once during each stud forming, transfer and welding cycle and coordinates many of the interrelated mechanisms which operate during such cycle. If for example six studs are to be welded to an electrode body, the shaft 148 will make one revolution for each sequence of operations required to form, transfer and weld one of the studs. Thus the main cam shaft 148 will make six revolutions from start to finish of the illustrated overall machine cycle. The main cam shaft 148 carries a driving sprocket 152 which is connected to a driven sprocket 154 on the coupling shaft 86 by a chain 157. The coupling shaft 86 carries the bevel gear 88 which meshes with the bevel gear 90, thereby imparting drive to the auxiliary cam shaft 70 of the stud forming mechanisms.

Detailed reference will now be made to FIGS. 1 and 2 to 7, inclusive, for a description of the work-support head, generally designated by the reference numeral 305, which supports rotate and axially displace the electrode body b in timed relation to operation of the stud forming transfer mechanisms. The work-support head 305 includes a mandrel 30 carried on a hollow mandrel supporting shaft 32 and arranged to present successive spaced locations about first and second circumferential paths of the electrode body at the welding position to receive successive studs formed internally of the machine. As seen best in FIGS. 2 and 3, the mandrel 30 includes a hollow cylindrical mandrel body 306 which is longitudinally cut to form a series of internal gripping chucks which may be spread into locking contact with an electrode body b slipped onto the mandrel by the machine operator. The mandrel supporting shaft 32 is hollow and receives a thrust member 308 which, in response to rearward axial displacement relative to the body 306, causes the spreading of the gripping chucks or jaws of the body. The thrust member 308 terminates at its forward end in diverging camming surfaces 308a (see FIG. 3) which progressively engage the leading ends of the chuck jaws in response to the rearward displacement of the thrust member 308 to achieve the required locking action. The locking action is brought about by a coil spring 310 which is interposed between a shoulder 308b on the thrust member 308 and a shoulder 32b on the rearward end of the hollow mandrel supporting shaft 32. Normally, the spring 310 is held in compression between the shoulders 32b, 308b, by a pneumatically-controlled piston and cylinder 312 having an inlet conduit 314 which is normally maintained under pressure and released at the beginning of the machine operating cycle to enable the spring 310 to lock the mandrel 30 to the electrode body b. The details of the pneumatic control 312 will be described in connection with FIG. 9. For the moment, it will suffice to point out that air is admitted to the pneumatic control 312 via a solenoid-controlled valve, the energization of which is determined by one of a bank of mircro-switches actuated by one of a series of cams on a lower main cam shaft 320 (see FIG. 9) which turns once during each complete machine cycle. That is, while the upper main cam shaft 148 makes six revolutions in the completion of one studded electrode, the lower main cam shaft 320 makes one revolution to achieve certain control functions which occur only once during the entire sequence of machine operations.

The supporting shaft 32 for the mandrel 30 is coupled via a slip drive to a motor 322, with provision to allow the motor 322 to index the supporting shaft 32 at the prescribed time during the operating machine cycle. Specifically, and as seen best in FIGS. 2 and 3, the motor 322 is supported beneath the bed-plate 54 of the machine and has its output shaft 322a coupled via an appropriate chain and sprocket 324 to an intermediate coupling shaft 326 which is journaled on appropriate bearings 328 fixed to the bed-plate. The coupling shaft 326 has a slidable connection or spline 329 to a further coupling shaft 330 which is journaled on appropriate bearings 332 fixed to a shiftable mandrel supporting carriage 348. The coupling shaft 330 is connected via a chain and sprocket 334 to the driving disc 336a of a slip clutch 336. The driving disc 336a is loosely journaled on the supporting shaft 32 and bears against a friction disc 336b for coupling to a driven disc 336c which is keyed to the shaft 32. The driven disc 336c is mounted for axial displacement on the shaft 32 and is urged into contact with the friction disc 336b and the driving disc 336a by a spring 338 which is interposed between the driven disc 336c and a collar 340 fixed to the supporting shaft 32. In the absence of any hold back effect on the supporting shaft 32, tending to cause the clutch 336 to slip, drive will be imparted to the supporting shaft 32 and the mandrel 30 will be rotated. However, the requisite hold back effect is exerted, except for the intervals when indexing is required, by a pawl and ratchet mechanism 342 (see FIG. 4) which is operatively connected to the mandrel supporting shaft 32 and periodically released to allow for the prescribed indexing. The pawl and ratchet mechanism 342 includes a ratchet wheel 344 having a number of circumferentially spaced notches 344a which may be engaged by the pawl 346. The pawl 346 is pivoted by a stud 350 on the rearward upstanding wall 348a of the shiftable mandrel supporting carriage 348. The spring 352 is connected between the rearward upstanding wall 348a of the carriage 348 and the pawl 346 to bias the pawl finger 346a in a counter-clockwise direction about the stud or pivot 350 such that the pawl finger 346a engages within the successive complementary notches 344a of the ratchet wheel 344. The ratchet notches 344a in this embodiment are spaced at 120° intervals with respect to each other such that the mandrel 30 is rotated through an angle of 120° under the influence of the slip drive when the hold back effect on the supporting shaft 32 is released by the movement of the pawl finger 346a out of the particular notch 344a in which it is seated.

A pawl operating mechanism controlled from the main cam shaft 148 is operatively engaged with the pawl 346 to release the same from the ratchet 344 after the completion of a stud forming and welding cycle to enable the mandrel 30 to be indexed through the prescribed angular traverse under control of its slip clutch drive. The pawl actuating mechanism, as seen best in FIGS. 1 and 4, includes an actuating shaft 354 which extends from side to side of the machine and is journaled at one end on an upstanding bracket 346 carried by the bed-plate 54 and at the other end on an appropriate bearing 348 carried by the standard of the bearing 328. Affixed to the actuating shaft 354 is an indexing plate 360 which is in contact with a roller 362 journaled on the lower end of the pawl 346. The actuating shaft 354, in response to clockwise rotation (see FIG. 4), causes the indexing plate 360 to pivot the pawl 346 about the pivot 350 to disengage the pawl finger 346a from the seating notch 344a. It will be appreciated by inspecting FIG. 2 that the index plate 360 is of a substantial width as compared to the roller 362 whereby it will make contact with the roller 362 as the latter is shifted along with the carriage 348, as will be subsequently described. Beyond the bearing 348, the actuating shaft 354 carries a crank arm 364 which is pivotally connected via a coupling rod 366 (see FIG. 1) to a bell-crank 368 pivoted on the bed-plate 54 by a bearing 370. The other arm of the bell-crank 368 carries a cam follower 372 which is in engagement with the indexing cam 374 on the main upper cam shaft 148. The actuating mechanism is arranged such that a thrust is imparted to the coupling link 366 urging the same from right to left in FIG. 1 whereby the crank arm pivots the actuating shaft 354 in the clockwise direction (see FIG. 4) to effect the required periodic operation of the pawl 346 for indexing of the mandrel.

The carriage 348, which includes the front and rear wall 348a, 348b and the connecting base 348c, is mounted for shifting from side to side (left and right in FIG. 2) by mounting the carriage or carrier 348 in an appropriate slideway 376 mounted on the bed-plate 54 of the machine. At the start of a machine cycle, the carriage 348 is in its retracted limit position, corresponding to the end of a cycle (see FIG. 13). The carriage 348 is then brought into the forward limit position of its side to side movement wherein the mandrel is disposed to receive the first circumferential row of studs (see FIGS. 10 and 11). After the first row of studs are formed and welded in place, the carriage 348 is shifted into the retracted limit position of its side to side movement to bring the mandrel into position to receive the second circumferentially spaced row of studs (see FIGS. 12, 13). The degree of carriage shifting, which may be controlled as detailed hereinafter, determines the axial spacing of the respective rows of studs in the final electrode assembly. Actuating mechanisms are connected to the carriage 348 for bringing the carriage into the forward limit position, and for retracting the same after completion of the first row or group of studs. The actuating mechanisms (see FIG. 2) include an actuating rod 378 which is coupled at one end by a collar 380 to an upstanding stud 382 on the carriage 348 and at the other end by a collar 384 to an actuating head 386 confined on the bed-plate 54 for side to side movement in a slideway 388. A pneumatic carriage shift control 390, including a cylinder and piston, is operatively connected to the actuating head 386. The piston and cylinder 390 are mounted on the bed-plate 54 with the piston shaft 390b connected to the actuating head 386. Air is selectively ported to one side or the other side of the piston head, as will be subsequently described in detail in conjunction with FIG. 9, by a solenoid controlled two-way valve 392 connected in the inlet conduits 394, 396.

Reference will now be made to FIGS. 2, and 5 to 7, inclusive, for a description of the mechanisms associated with the combined reference and stripping flange 50 which is initially positioned as seen in FIG. 2, to provide a slant reference face against which the slant rear face *f* of the electrode body may be brought when initially mounted on the mandrel of the machine, which is then retracted to the position illustrated in FIGS. 10, 11 and 12, wherein the flange does not interfere with the rotation of the mandrel during the welding of the first and second circumferentially-extending rows of studs to the electrode body and which is finally advanced through a stripping stroke to the extended position illustrated in FIG. 13 during which the flange is effective to remove the completed electrode from the mandrel. The reference flange is carried on a supporting shaft or rod 400 by a transversely-extending arm 402. The shaft or rod 400 is mounted on the mandrel shift carriage 348 by appropriate bearings 404 and terminates at its rearward end in a shoulder 400a. On the rod intermediate the shoulder 400a and the adjacent bearing 404 is a coil spring 406 which tends to urge the supporting shaft 400 to the left in FIG. 2. The position of the shaft 400 and of the combined reference and stripping flange 50 relative to the mandrel 30 is determined by a pneumatic control 408, shown in detail in FIG. 5. The pneumatic control is in the form of a double piston and cylinder which is connected in the pneumatic system by two inlet conduits 410, 412 having respective pressure relief valves 411, 413. The admission of air to the inlet conduit 410 is determined by a solenoid controlled valve 414, while the admission of air to the inlet conduit 412 is determined by a solenoid valve 416. The valves 412, 414 are coordinated into the overall pneumatic system and control as will be described in conjunction with FIG. 9.

Figure 4:
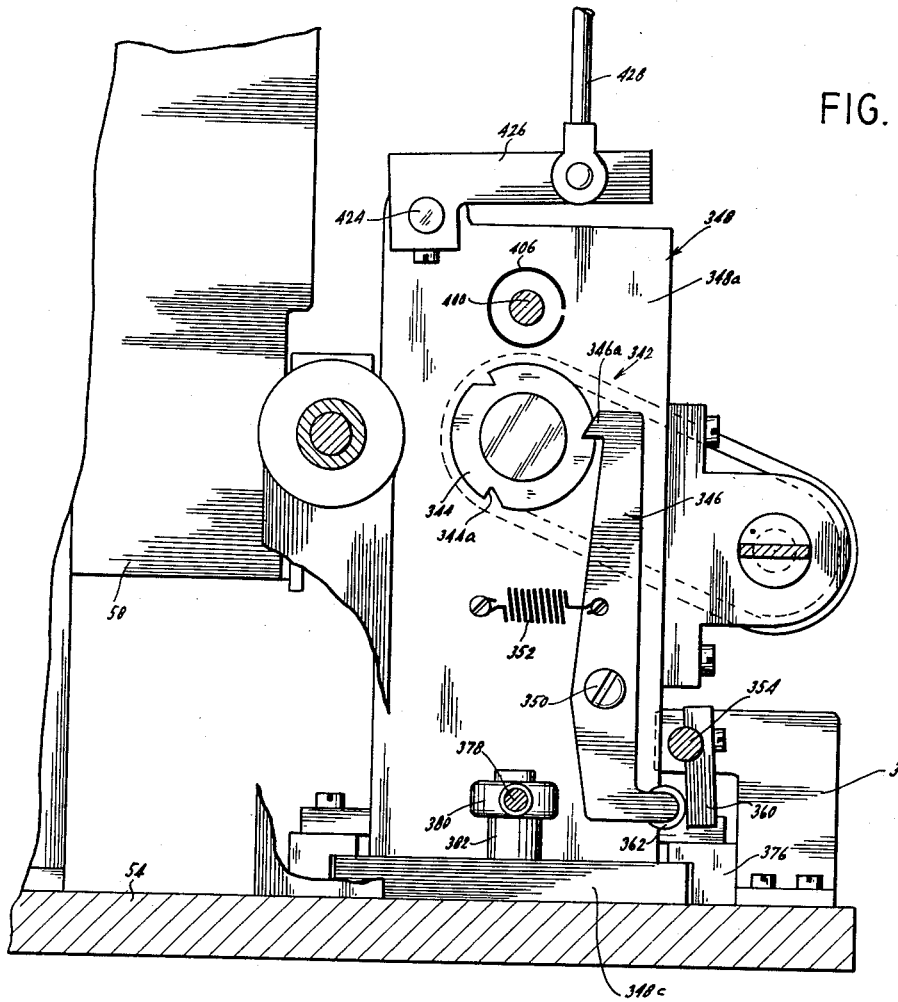
FIG. 4 is a transverse elevational view, taken substantially along the line 4—4 of FIG. 2 and looking in the direction of the arrows, showing the details of the indexing and actuating mechanisms for the mandrel.
Figure 5:
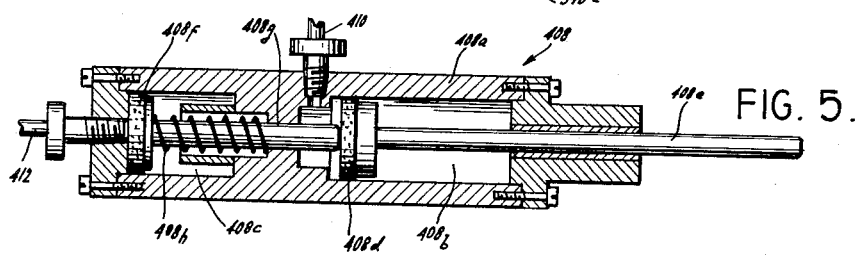
FIG. 5 is a longitudinal section taken substantially along the line of 5—5 of FIG. 1, showing the details of the pneumatic control for the combined reference and stripping flange associated with the mandrel.
Figure 6:
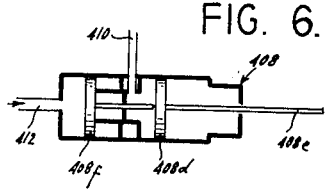
FIG. 6 is a diagrammatic showing of the pneumatic control of FIG. 5 illustrating the normal or at rest position of the pneumatic control, corresponding to the position of the reference and stripping flange in FIG. 2.
Figure 7:
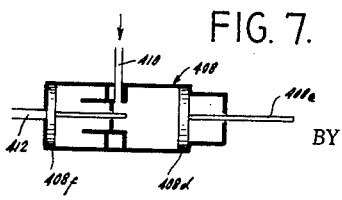
FIG. 7 is a view similar to FIG. 6 but showing the relative position of the pneumatic control when the reference and stripping flange is in the forwardly extended position corresponding to that illustrated diagrammatically in FIG. 13.

Referring now specifically to FIGS. 5 to 7, inclusive, the pneumatic stripper control is seen to include a cylinder body 408a having a first piston chamber 408b and a second piston chamber 408c. In the piston chamber 408b is a piston 408d connected to a piston shaft 408e which bears against the shoulder 400a of the stripper supporting shaft 400. Within the piston chamber 408c is a piston head 408f which carries a piston shaft 408g which in turn bears against the piston head 408d in the chamber 408b. Surrounding the piston shaft 408g is a coil spring 408h which tends to bias the piston head 408f to the left in FIG. 9 and toward the end of the piston chamber in communication with the air inlet conduit 412. The piston shaft 408e in turn is biased to urge the piston head 408d against the piston shaft 408g by the spring 406 which tends to urge the piston shaft 408e to the left whereby the piston head 408d is at the end of the chamber 408b adjacent the air inlet conduit 410. At the beginning of the machine cycle, the stripping flange 50 is brought to the reference position illustrated in FIG. 2 by the admission of air through the inlet conduit 412 into the chamber 408c which urges the piston head 408f to the limit position determined by the construction of this piston and cylinder assembly. This limit position and the relative position of the double piston and cylinder pneumatic control 408 is illustrated diagrammatically in FIG. 6. During the actual machine cycle the parts of the pneumatic control 408 are in the relative position illustrated in FIG. 5 wherein the reference and stripping flange 50 is moved into the retracted position illustrated in FIGS. 10 and 11 wherein the chucked electrode body *b* is free to rotate under control of its indexing drive. At the end of the machine cycle, air is admitted through the inlet conduit 410 into the chamber 408b driving the piston 408d to the limit of its stroke, as illustrated diagrammatically in FIG. 7. This movement in turn causes the stripping flange to move from the position illustrated in FIG. 12 to that illustrated in FIG. 13 during which forward stroke the completed electrode body is stripped from the supporting mandrel. The pneumatic control 408 and its coordination into the overall pneumatic and control system will be more thoroughly understood in conjunction with FIG. 9.

As previously detailed, the electrically isolated weld transfer head 236 serves as one welding terminal or electrode. The mandrel itself is intended to serve as the other welding terminal or electrode. To this end, a circular contact member 420 is carried on the conductive supporting shaft 32 for rotation therewith and a contact shoe 422 is arranged to make electrical contact with the contact member 420 at a time just prior to the application of welding pressure to a stud brought into the welding position P. The contact shoe 422 is spaced from the contact member 420 during the indexing intervals so as not to interfere with the rotation of the mandrel 30 through its prescribed angular traverse for welding of successive studs about the periphery of the electrode body supported thereon. The contact shoe 422 is pivotally supported on a rocker shaft 424 which is journaled on appropriate bearings carried by the shiftable carriage 348. As seen best in FIGS. 2 and 4, the end of the rocker shaft 424 remote from from the contact shoe 422 carries a rocker arm 426 which is coupled via a connecting link 428 to a cam follower arm 430. The connections between the rocker arm 426 and the cam follower arm 430 are such as to provide an effective coupling, yet allow for the shifting of the rocker shaft 424 and the contact shoe 422 with the mandrel. Accordingly the rocker operating mechanism will be effective to bring the contact shoe against the contact member or collar 420 in either of the limit positions of the carriage 348 in which limit positions the successive groups of studs are welded to the mandrel. The cam follower arm 430 is pivotally supported on a mounting shaft 432 which extends rearwardly and is journaled by appropriate bearings 434 on the upstanding supporting wall 58. The cam follower arm 430 carries a follower 436 which is urged into contact with the weld shoe control cam 438 by a spring (not shown). The development of the cam 438 is selected such that when successive studs are to be welded, the connecting link 428 is displaced upwardly to pivot the rocker arm 426 in the counter-clockwise direction in FIG. 4 which turns the rocker shaft 424 in the same direction, thereby bringing the contact shoe 422 against the contact member 420.

Figure 9:
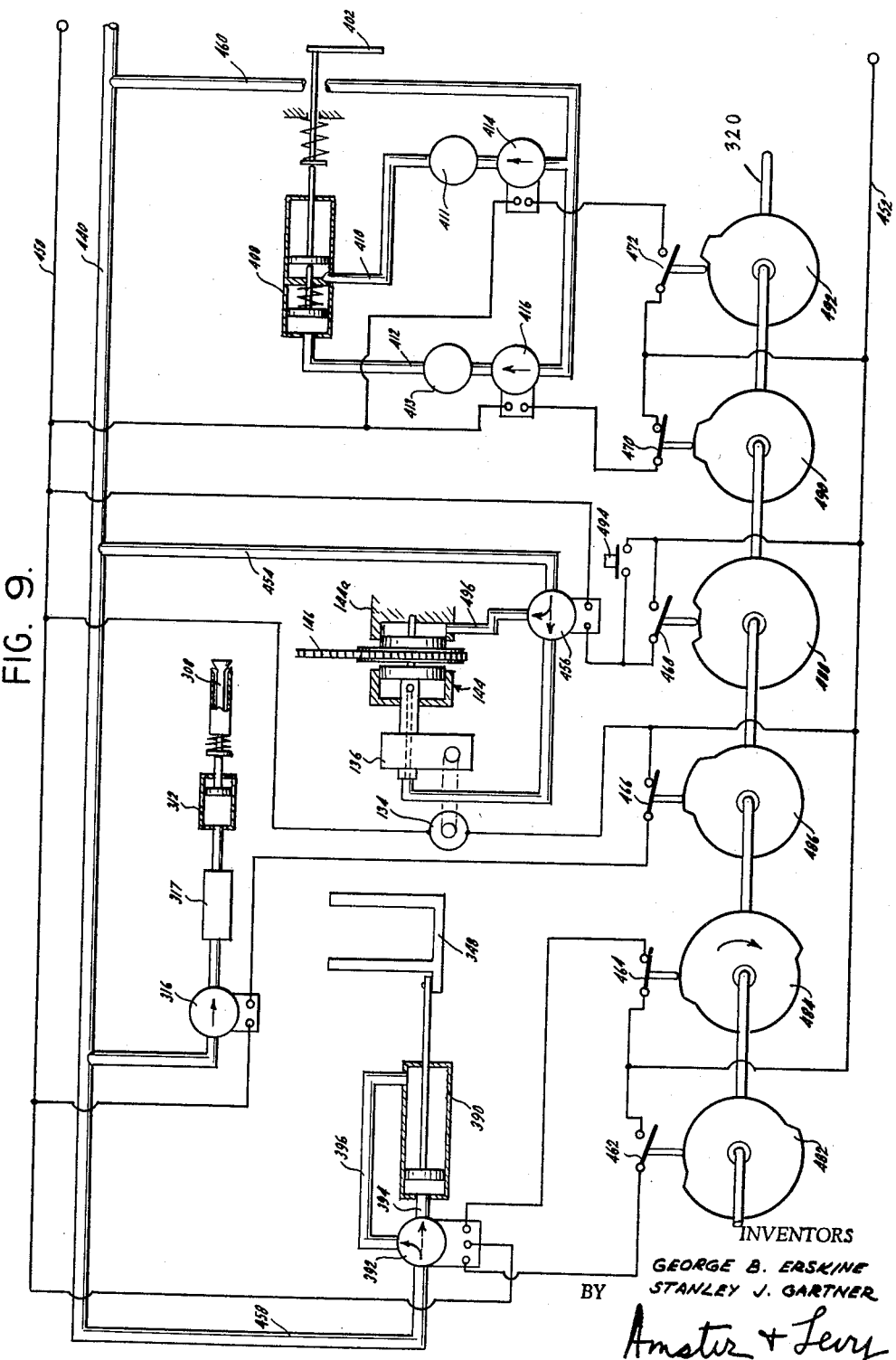
FIG. 9 is a combined schematic and diagrammatic showing of the various inter-related functions which occur at the beginning of, during and at the end of a complete operating cycle in the manufacture of a studded electrode by the present machine.

Reference will now be made to FIGS. 8 and 9, supplemented from time to time by the showings in FIGS. 1 to 7 of the drawings, for a description of the controls which are effective during the overall machine cycle for timing the required interrelated functions. As to the pneumatic system, the main air inlet conduit 440 includes a branch 454 for the two-position solenoid controlled valve 456 associated with the main brake and clutch 144 of the machine drive. A further branch 458 is connected to a two-position solenoid controlled valve 392 which controls the admission of air to the pneumatic control 390 for the shiftable mandrel carriage 348. A further branch 460 is connected to the solenoid controlled valves 414, 416 for the pneumatic stripper control 408.

The electrical input lines 450, 452 are connected to the solenoid controlled valves 316, 392, 414, 416 and 456 and the energization circuits for these valves are completed via a bank of cam controlled switches 462, 464, 466, 468, 470, 472 controlled by the cams 482, 484, 486, 488, 490 and 492 mounted on the lower cam shaft 320 (see FIG. 8). The switches 464, 466 and 470 are closed at the start of operation while the switches 462, 468 and 472 are open at the start of operation. The open switch 468 is by-passed by a push button start switch 494 which is seen in FIG. 1 to be in a location on the bench-like support adjacent the mandrel 30 and readily accessible to the operator. The push button start switch 494 is depressed to initiate operation, as will appear more fully hereinafter.

The lower cam shaft 320 which controls the overall machine cycle is coupled to and driven by the upper cam shaft 148 via an appropriate sprocket and gear coupling including a driving sprocket 500 (see FIG. 8) connected to the upper cam shaft 148, a driven sprocket 502 connected to a coupling shaft 504, a chain 506 trained over the sprockets 500, 502, a first spur gear 508 on the coupling shaft 504, and a second spur gear 510 in meshing engagement with the first spur gear and connected to the lower cam shaft 320. The gear reduction obtained via this coupling causes the lower cam shaft 320 to turn once during every six revolutions of the upper cam shaft for the illustrated electrode type.

In FIG. 9, the cams has been turned 90° relative to the cam shaft 320 and it is presumed that the cam shaft 320 is rotated in a direction to turn the respective cams in the clockwise direction, as indicated by the directional arrow. At the start of operation, the brake section 144a of the main drive is on since the valve 456 is arranged to normally connect the branch 454 to the inlet conduit 496. It will thus be appreciated that the machine is positively stopped at the completion of a machine cycle. The shiftable mandrel supporting carriage 348 is in the retracted position illustrated in FIG. 2, since the solenoid controlled valve 392 directs the air from the branch 458 through the inlet conduit 396 and into the piston and cylinder 390 to the right of the piston head. The pneumatic stripper control 408 is in the position illustrated in FIG. 6 wherein the combined reference and stripping flange 50 is arranged to serve as a reference for the electrical body b being placed on the mandrel 30. This is accomplished since the switch 470 is closed to cause the solenoid controlled valve 416 to admit fluid from the branch conduit 460 via the inlet conduit 412 into the appropriate chamber of the pneumatic stripper control 408.

At the start of operation, the operator (after placing an electrode body b on the mandrel) depresses the push button start switch 494 which engages the clutch 144b and disengages the brake 144a to impart drive to the machine. As the lower cam shaft 320 rotates, the cam 488 closes a switch 468 which by-passes the start button or switch 494 and allows the operator to release the start button for automatic cycling of the machine under control of the switch 468 which functions as the main or master control switch.

Almost instantaneously, the switch 466, under control of the cam 486, opens which in turn closes the solenoid controlled valve 316, thereby allowing the pneumatic control 312 to be connected to the atmosphere via the pressure relief valve 317. This allows the chuck to expand under the influence of its spring such that the mandrel 30 is locked to the electrode body b. When the mandrel is locked to the electrode body, the switch 470 under control of the cam 490, opens to close the solenoid controlled valve 416, thereby cutting off the air supply to the left-hand chamber of the stripper control 408 via the inlet conduit 412. The inlet conduit 412 is connected to the atmosphere via the pressure relief valve 413, thereby bringing the pneumatic control 408 to the position in FIG. 5 with the reference flange 50 retracted. This is the position which the reference flange occupies during almost the entire machine cycle until stripping is to be achieved at the end of the machine cycle.

Early in the cycle, the switch 462 is closed by the cam 482 and the switch 464 is opened by the cam 484 such that the solenoid controlled valve 392 is operated to introduce air from the branch 458 via the inlet conduit 394 to the left side of the piston head of the mandrel carriage control 390. This shifts the carriage 348 from the retracted position of FIG. 12 into the advanced position of FIGS. 10 and 11 to receive the first group of studs.

After the first group of circumferentially extending studs are welded to the electrode body, the switch 462 opens under control of the cam 482 and the switch 464 closes under control of the cam 484 whereby the solenoid controlled valve 392 again applies air pressure to the air inlet conduit 396 which is effective via the pneumatic control 390 to retract the mandrel 30 through a prescribed axial travel to bring a further circumferential path about the electrode body into position for welding thereto of a group of studs. After the second group of studs are welded to the electrode body, the switch 472 closes under control of the cam 492 which operates the solenoid controlled valve 414 to connect the branch 460 to the inlet conduit 410 for the right-hand valve and piston of the pneumatic control 408. This is effective to drive the stripping flange 50 through the stripping stroke. After the stripping stroke is completed, the pressure relief valve 411 allows the right-hand piston to return to the rest position illustrated in FIG. 6 wherein the reference flange is oriented for the next machine cycle. The machine cycle is completed when the switch 468 opens under control of the cam 488.

The mechanisms and controls incorporated into our machine are such as to render the same readily convertible from one type of studding operation to another with a minimum amount of complexity and with a comparatively short changeover time. For example, if only two studs are to be welded at each circumferential location, the upper cam shaft is arranged to rotate four times for one rotation of the lower cam shaft and the mandrel indexing mechanism is arranged to index the mandrel through 180° in response to each rotation of the upper cam shaft. This change-over is essentially completed by changing the gearing between the upper and lower cam shafts and by replacing the ratchet wheel of the index mechanism.

If the relative spacing between the groups of circumferentially-extending studs is to be changed, it is a simple matter to change the degree of shift imparted to the carriage between the successive groups of stud forming and welding sequences. For the sake of convenience, the various cams employed through the machine are of the type which are removably mounted on their cam shafts so that they may be readily replaced by other cams in accordance with the desired timing and sequence for the formation of a particular type of studded electrode. The many and varied applications for our machine should be apparent to those skilled in the art from a consideration of the detailed description.

A latitude of modification, change and substitution is intended in the foregoing disclosure and in some instances, some features of the invention will be used without a corresponding use of other features. Accordingly, it is appropriate that the appended claims be construed broadly and in a manner consistent with the scope and spirit of the contribution herein.

What we claim is:

1. In a machine for the manufacture of studded electrodes, a mandrel adapted to receive an electrode body and including a hollow cylindrical mandrel body having a series of gripping jaws adapted to be expanded into locking engagement with said electrode body, an expanding member disposed within said mandrel body and arranged to expand said gripping jaws in response to axial displacement of said expanding member relative to said mandrel body, and means operatively connected to said expanding member to axially displace said expanding member for locking said gripping jaws in engagement with said electrode body.

2. In a machine for the manufacture of studded electrodes, a mandrel adapted to receive an electrode body and including a hollow cylindrical mandrel body having a series of gripping jaws adapted to be expanded outwardly into locking engagement with said electrode body, an expanding member disposed within said mandrel body and arranged to be axially displaced relative to said mandrel, cooperating camming surfaces on said expanding member and said mandrel arranged to expand said jaws in response to axial displacement of said expanding member relative to said mandrel body, and means operatively connected to said expanding member to axially displace said expanding member for locking said gripping jaws in engagement with said electrode body.

3. In a machine for the manufacture of studded electrodes, a mandrel adapted to receive an electrode body and including a hollow cylindrical mandrel body having a series of gripping jaws adapted to be expanded outwardly into locking engagement with said electrode body, an expanding member disposed within said mandrel body and arranged to expand said jaws in response to axial displacement of said expanding member relative to said mandrel body, means operatively connected to said expanding member to axially displace said expanding member for locking said gripping jaws in engagement with said electrode body, a combined reference and stripper flange mounted on said mandrel body for retractile and extensile movement relative to a reference position, and means for moving said flange in timed relation to the means for axially displacing said expanding member.

4. A work-supporting head for use in conjunction with a machine for welding radially extending studs to an electrode body of the type including welding mechanisms located at a work location comprising a mandrel body, said body being expandible under the exertion of outward radial pressure, a thrust member contained within said body having diverging camming surfaces at its forward end engageable with said body, said thrust member being movable coaxially of said body, said body expanding and contracting when said thrust member is moved axially of said body, a control element operable to axially move said thrust member between an active mandrel body-expanding position and an inactive position, means mounting said mandrel body and said thrust member for rotational movement, rotational drive means for said mandrel body to move a selected circumferential location of said electrode body to said work location, means mounting said mandrel body and said thrust member for axial displacement, axial movement actuating mechanisms, a stripping flange coaxially located about said mandrel body, means mounting said stripping flange for axial movement with respect to said mandrel body, and a stripper control operatively connected to said stripper flange operable to strip said electrode body from said mandrel body.

5. A work-supporting head for use in conjunction with a machine for welding radially extending studs to an electrode body of the type including stud forming mechanisms and stud welding mechanisms located at a work location comprising a mandrel body, said body being expandible under the exertion of outward radial pressure, a thrust member contained within said body having diverging camming surfaces at its forward end engageable with said body, said thrust member being movable coaxially of said body, said body expanding and contracting when said thrust member is moved axially of said body, a control element operable to axially move said thrust member with respect to said mandrel body to expand and contract the same, means mounting said mandrel body and said thrust member for rotational movement, rotational drive means for said mandrel body, indexing means to selectively index said mandrel body and an electrode contained thereon through a preselected rotational travel to bring a selected circumferential location of said electrode body to said work location, a stripping flange coaxially located about said mandrel body, means mounting said stripping flange for axial movement with respect to and independent of said mandrel body, a stripper control operatively connected to said stripper flange operable to position said electrode body on said mandrel body and in timed relation to the completion of operations of said machine, to strip said electrode body from said mandrel body.

6. A work-supporting head for use in conjunction with a machine for welding radially extending studs to an electrode body of the type including stud forming mechanisms and stud welding mechanisms located at a work location comprising a mandrel body, said body being expandable under the exertion of outward radial pressure, a thrust member contained within said body having diverging camming surfaces at its forward end engageable with said body, said thrust member being movable coaxially of said body, said body expanding and contracting when said thrust member is moved axially of said body, bias means operatively engaged with said thrust member to bias same in one direction to cause said body to normally remain expanded, a control element operable in opposition to said biasing means, said mandrel body assuming a contracted position upon activation of said control element, means mounting said mandrel body and said thrust member for rotational movement, rotational drive means for said mandrel body, indexing means to selectively index said mandrel body and an electrode contained thereon through a preselected rotational travel to bring a selected circumferential location of said electrode body to said work location, means mounting said mandrel body and said thrust member for axial displacement, axial movement actuating mechanisms, indexing means to selectively determine the degree of axial movement of said mandrel body to bring a selected axial location of said mandrel body to said work location, a stripping flange coaxially located about said mandrel body, means mounting said stripping flange for axial movement with respect to and independent of said mandrel body, and a pneumatic stripper control operatively connected to said stripper flange operable to position said electrode body on said mandrel body and in timed relation to the completion of operations of said machine, to strip said electrode body from said mandrel body.

7. A work-supporting head for use in conjunction with a machine for welding radially extending studs to an electrode body of the type including stud forming mechanisms and stud welding mechanisms located at a work location comprising a mandrel body formed with a plurality of longitudinal cuts, said body being expandible under the exertion of outward radial pressure, a thrust member contained within said body having diverging camming surfaces at its forward end engageable with said body, said thrust member being movable coaxially of said body, said body expanding and contracting when said thrust member is moved axially of said body, bias means operatively engaged with said thrust member to bias same in one direction to cause said body to normally remain expanded, a control element operable in opposition to said biasing means, said mandrel body assuming a contracted position upon activation of said control element, means mounting said mandrel body and said thrust member for rotational movement, rotational drive means for said mandrel body, indexing means to selectively index said mandrel body and an electrode contained thereon through a preselected rotational travel to bring a selected circumferential location of said electrode body to said work location, means mounting said mandrel body and said thrust member for axial displacement, axial movement actuating mechanisms, indexing means to selectively determine the degree of axial movement of said mandrel body to bring a selected axial location of said mandrel body to said work location, a combined reference and stripping flange coaxially located about said mandrel body, means mounting said reference and stripping flange for axial movement with respect to and independent of said mandrel body, and a stripper control operatively connected to said combined reference and stripper flange operable to position said electrode body on said mandrel body and, at the completion of operations of said machine, to strip said electrode body from said mandrel body.

8. A work-supporting head for use in conjunction with a machine for welding radially extending studs to an electrode body of the type including stud forming mechanisms and stud welding mechanisms located at a work location comprising a mandrel body formed with a plurality of longitudinal cuts, said body being expandable under the exertion of outward radial pressure, a thrust member contained within said body having diverging camming surfaces at its forward end engageable with said body, said thrust member being movable coaxially of said body, said body expanding and contracting when said thrust member is moved axially of said body, bias means operatively engaged with said thrust member to bias same in one direction to cause said body to normally remain expanded, a control element operable in opposition to said biasing means, said mandrel body assuming a contracted position upon activation of said control element, means mounting said mandrel body and said thrust member for rotational movement, rotational drive means for said mandrel body, indexing means to selectively index said mandrel body and an electrode contained thereon through a preselected rotational travel to bring a selected circumferential location of said electrode body to said work location, means mounting said mandrel body and said thrust member for axial displacement, axial movement actuating mechanisms, indexing means to selectively determine the degree of axial movement of said mandrel body to bring a selected axial location of said mandrel body to said work location, a stripping flange coaxially located about said mandrel body, means mounting said stripping flange for axial movement with respect to and independent of said mandrel body, a stripper control operatively connected to said stripper flange operable to position said electrode body on said mandrel body and, at the completion of operations of said machine, to strip said electrode body from said mandrel body, and coordinated control mechanisms operable to activate said thrust control member, said mandrel rotational drive means, said mandrel axial movement means and said pneumatic stripper control for coordinated action in the welding of studs to an electrode body.

9. A work-supporting head for use in conjunction with a machine for welding radially extending studs to an electrode body of the type including stud forming mechanisms and stud welding mechanisms located at a work location comprising a mandrel body formed with a plurality of longitudinal cuts, said body being expandible under the exertion of outward radial pressure, a thrust member contained within said body having diverging camming surfaces at its forward end engageable with said body, said thrust member being movable coaxially of said body, said body expanding and contracting when said thrust member is moved axially of said body, bias means operatively engaged with said thrust member to bias same in one direction to cause said body to normally remain expanded, a pneumatic control element operable in opposition to said biasing means, said mandrel body assuming a contracted position upon activation of said pneumatic control element, means mounting said mandrel body and said thrust member for rotational movement, rotational drive means for said mandrel body, indexing means to selectively index said mandrel body and an electrode contained thereon through a preselected rotational travel to bring a selected circumferential location of said electrode body to said work location, means mounting said mandrel body and said thrust member for axial displacement, axial movement actuating mechanisms, indexing means to selectively determine the degree of axial movement of said mandrel body to bring a selected axial location of said mandrel, a combined reference and stripping flange coaxially located about said mandrel body, means mounting said reference and stripper flange for axial movement with respect to and independent of said mandrel body, a pneumatic stripper control operatively connected to said combined reference and stripper flange operable to position said electrode body on said mandrel body and, at the completion of operations of said machine, to strip said electrode body from said mandrel body, and coordinated control mechanisms operable to activate said thrust control member, said mandrel rotational drive means, said mandrel axial movement means and said pneumatic stripper control for coordinated action in the welding of studs to an electrode body.

References Cited in the file of this patent

UNITED STATES PATENTS

| | | |
|---|---|---|
| 1,907,896 | Summey | May 9, 1933 |
| 2,306,466 | Patterson | Dec. 29, 1942 |
| 2,916,224 | Larsen | Dec. 8, 1959 |